United States Patent [19]

Barea

[11] Patent Number: 5,291,024
[45] Date of Patent: Mar. 1, 1994

[54] METHOD FOR DETERMINING THE POSITION AND SHAPE OF A YARN FED TO A TEXTILE MACHINE

[75] Inventor: Tiziano Barea, Varese, Italy
[73] Assignee: International Trading S.r.l., Italy
[21] Appl. No.: 900,153
[22] Filed: Jun. 17, 1992

[30] Foreign Application Priority Data

Jun. 17, 1991 [IT] Italy .................. MI91A 001658

[51] Int. Cl.$^5$ ............................................ G01N 21/86
[52] U.S. Cl. .................................... 250/561; 356/429
[58] Field of Search ........................... 356/429–431, 356/238, 384–387; 250/571, 572, 559, 561, 548, 560, 205

[56] References Cited

U.S. PATENT DOCUMENTS

| | | | |
|---|---|---|---|
| 2,641,960 | 6/1953 | Strother | 356/429 |
| 3,453,053 | 7/1969 | Gunn-Russell | 356/238 |
| 3,543,360 | 12/1970 | Fertig | 356/430 |
| 3,582,661 | 6/1971 | Emmasingel | 356/429 |
| 4,007,457 | 2/1977 | Aeppli | 356/430 |
| 4,306,812 | 12/1981 | Lapp et al. | 356/429 |
| 4,341,958 | 7/1982 | Ohsawa | 356/238 |
| 4,511,253 | 4/1985 | Glöckner et al. | 356/429 |
| 4,924,406 | 5/1990 | Bergamini et al. | 250/572 |
| 5,012,086 | 4/1991 | Barnard | 250/222.1 |
| 5,130,556 | 7/1992 | Duncan et al. | 250/561 |

FOREIGN PATENT DOCUMENTS

| | | | |
|---|---|---|---|
| 202010 | 2/1955 | Austria | 356/238 |
| 0100412 | 2/1984 | European Pat. Off. | |
| 2064106 | 6/1981 | United Kingdom | 356/238 |
| 2103357 | 2/1983 | United Kingdom | |

OTHER PUBLICATIONS

The Patent Abstracts of Japan, vol. 7, 177, 58-7896-1(A), May 1983.
Patent Abstracts of Japan, vol. 11, No. 22; 61-19610-9(A); Aug. 1986.
Electronic Engineering, vol. 59, No. 732, Dec. 1987, p. 23.

*Primary Examiner*—Michael Messinger
*Attorney, Agent, or Firm*—Steinberg & Raskin

[57] ABSTRACT

A method and device for determining the state of a movement or stoppage of a yarn fed to a textile machine in which a variation in the shape and/or position of the yarn relative to an optical sensor in front of which the yarn runs during its feed to the textile machine is determined. On the basis of this variation, an output electrical signal is generated and is used for operating an operating member of the textile machine such as an indicator for indicating the state of movement of the yarn, a machine control circuit or a similar operating member. The method is implemented by an optical sensor which generates at least one output which is a variable electrical signal on the basis of a variation in the shape and/or position of the yarn relative to the sensor. The signal is compared with a reference signal in order to operate a switch device which causes the output electrical signal to be generated.

20 Claims, 1 Drawing Sheet

METHOD FOR DETERMINING THE POSITION AND SHAPE OF A YARN FED TO A TEXTILE MACHINE

BACKGROUND OF THE INVENTION

This invention relates to a method for determining the state of a movement or a stoppage of a yarn being fed to a textile machine, and subsequently for further verifying that the yarn is correctly fed to the textile machine. The method involves determining and monitoring the state of movement or stoppage of a yarn fed to a textile machine, by using an optical sensor.

The invention also relates to a device for implementing the method for determining the state of movement or stoppage of a yarn fed to a textile machine.

Various devices and methods are already known for determining the state of progress or stoppage or, in general, the state of movement of yarn fed to a textile machine.

One of these devices has substantially a "tuning fork" configuration and basically comprises a sensitive magnetostrictive piezoelectric element or the like which converts vibrations generated by a feeler member of tuning fork configuration, in contact with the yarn, into electrical signals. The electrical signals are used to measure the yarn movement by an electrical or electronic circuit which controls the machine operation.

Such a device, or similar devices, comprising generally a feeler member in direct contact with the yarn and connected to a sensitive element of the aforesaid type, has considerable drawbacks.

In this respect, it is substantially influenced by vibration or noise external to the machine or generated within the machine during its operation.

These noises and vibrations considerably limit the application of such devices to textile machines.

This is because such noises and vibrations in many cases exceed the vibration generated by the yarn of the feeler member and transmitted to the sensitive element. Because of such noise, the sensitive element may therefore generate spurious signals which prejudice the proper operation of the machine. Consequently, such devices must necessarily be combined with anti-vibration members which limit these external influences in determining the state of the yarn.

Other devices of electrostatic type are known, but these are easily influenced by the conditions of the environment in which they operate, and by the humidity and type of yarn.

Such devices, which operate (as is well known) on the basis of the electrostatic charges generated by the moving yarn with which they cooperate, are considerably influenced by the moisture content of the yarn, to the extent that a yarn which is too moist is unable, during its passage over the corresponding device, to leave or generate electrostatic charges which are sufficient for the corresponding device to detect effective movement.

Similar problems arise when the yarn is too dry or too easily electrifiable, i.e., susceptible to being electrified such as yarns containing wool, which electrify excessively to falsify the measurement of the state of movement by the sensor device. In such a case, the sensor device is able to detect a state of movement of the yarn even if it is not moving.

Other photoelectric cell devices are also known for determining the state of progress of yarn fed to a textile machine.

Briefly, these operate on the basis of interrupting a light beam generated by a light emitter and directed onto a receiver member connected to a control circuit. When the yarn positioned between the emitter and receiver moves, it shifts in position between these members and interrupts the light beam present between them.

This enables the control circuit to sense the movement and to control, in a known manner, the operation of the textile machine or that part of it to which the yarn is fed.

Such a photoelectric cell device requires precise setting and precise positioning relative to the emitter and receiver to ensure that during each stage of operation of the textile machine the yarn always remains between the emitter and receiver.

These devices are consequently difficult to apply, an additional complication being that they have to be positioned as close as possible to the bobbins from which the yarn unwinds, because only in such a position, the yarn has sufficient agitation to give it a high probability of detection.

In addition, to enable the light beam passing between the emitter and receiver to be easily interrupted by the yarn and enable the control circuit to generate an appreciable signal indicative of the movement of the yarn, the light beam must have a cross-section equal to or only slightly greater than that of the yarn being monitored. Because of this, requirement such a device is very sensitive to the accumulation of dust or residues left on it by the moving yarn. The dust or residues can obscure the light beam, which typically has a very small cross-section (such as that of the yarn).

This obscuring adversely affects the proper operation of the device.

OBJECTS AND SUMMARY OF THE INVENTION

An object of the present invention is therefore to provide a new and improved method for determining in a totally reliable manner the state of progress of a yarn fed to a textile machine.

A further object of the present invention is to provide a new and improved method which is relatively simple to implement and can be effected at a low cost and with a small number of components.

A further object of the present invention is to provide a new and improved method of the aforesaid type which gives excellent results even when applied to textile machine in which a significant amount of dust is generated, as in jute processing.

A further object of the present invention is to provide a new and improved method of the aforesaid type which gives excellent results even when applied to textile machines in which there is substantial vibration generation or which are located in noisy environments.

A further object of the present invention is to provide a new and improved method which can be used with excellent results to determine the state of progress of yarn under non-optimum environmental conditions.

A further object of the present invention is to provide a new and improved method for determining the movement of a yarn fed to a textile machine by detecting any irregularity in the yarn such as small malformation or count variation. Nevertheless, the yarn having any such irregularity may still be acceptable for the use of the yarn.

A further object of the present invention is to provide a new and improved device for determining and monitoring the state of progress of yarn fed to a textile machine which is of simple construction, of low cost, of universal application to any type of textile machine and is able to operate, without any problem, under any yarn and/or environmental humidity condition or under any noise or vibration level of the environment in which the textile machine is located or of the machine itself.

A further object of the present invention is to provide a new and improvement device of the aforesaid type able to operate properly under nonideal conditions of dust and cleanliness, i.e., when the moving yarn carries with it any dust or the like which thus is likely to settle on the device.

A further object of the present invention is to provide a new and improved device for determining the state of progress of a yarn of the aforesaid type in which this determination is effected without requiring any contact with the yarn, with the result that the characteristics of the yarn do not undergo alteration.

A further object of the present invention is to provide a new and improved device of the aforesaid type which can be positioned at any point of the path followed by the yarn directed to the textile machine.

A further object of the present invention is to provide a new and improved device of the aforesaid type which is able to determine the correct progress of the yarn also by detecting any irregularity in the yarn such as count variation or the presence of small malformations, or the presence of foreign bodies entrained by the yarn.

These and further objects which will be apparent to the expert of the art are attained by a method for determining and monitoring the state of movement or stoppage of a yarn fed to a textile machine. The method includes the steps of arranging an optical sensor having a sensitive region in which the sensor detects movement, feeding a yarn to a textile machine through the sensitive region such that the yarn is freely movable through the sensitive region, determining a variation in the shape and/or position of the moving yarn relative to the optical sensor, and generating a first electrical signal and a second electrical signal on the basis of the variation in position and/or shape of the yarn. Also, an operating member of the textile machine is arranged to operate on the basis of a relative variation of the first and second electrical signals and is selected from a group consisting of an indicator for indicating the state of movement or stoppage of the yarn and a machine control circuit.

The method is implemented by a device for determining the state of movement or stoppage of a yarn fed to a textile machine. The device includes optical sensor means having a sensitive comparator means arranged to compare a first electrical signal and a second electrical signal emitted by the sensor means with a reference signal. The first and second electrical signals are generated in accordance with the variation in the position and/or shape of the yarn relative to the sensor means as the yarn passes through said sensitive region. The comparator means generate at least one electrical output signal indicative of the state of movement or stoppage of the yarn on the basis of a relative variation of the first and second electrical signals.

BRIEF DESCRIPTION OF THE DRAWINGS

The present invention will be more apparent from the accompanying drawing, which is provided by way of non-limiting example and in which.

DETAILED DESCRIPTION OF THE INVENTION

Figure 1:
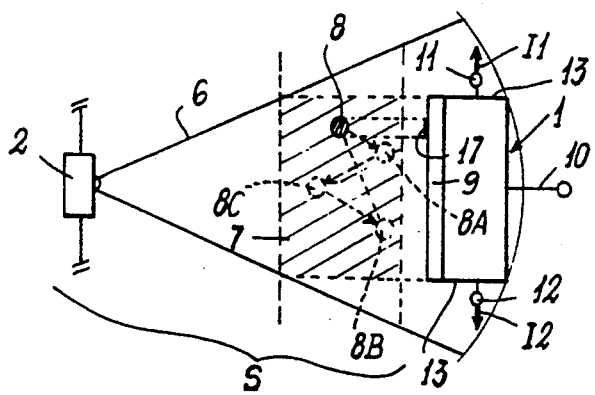
FIG. 1 is a partial side view of a first embodiment of the device according to the invention.
Figure 2:
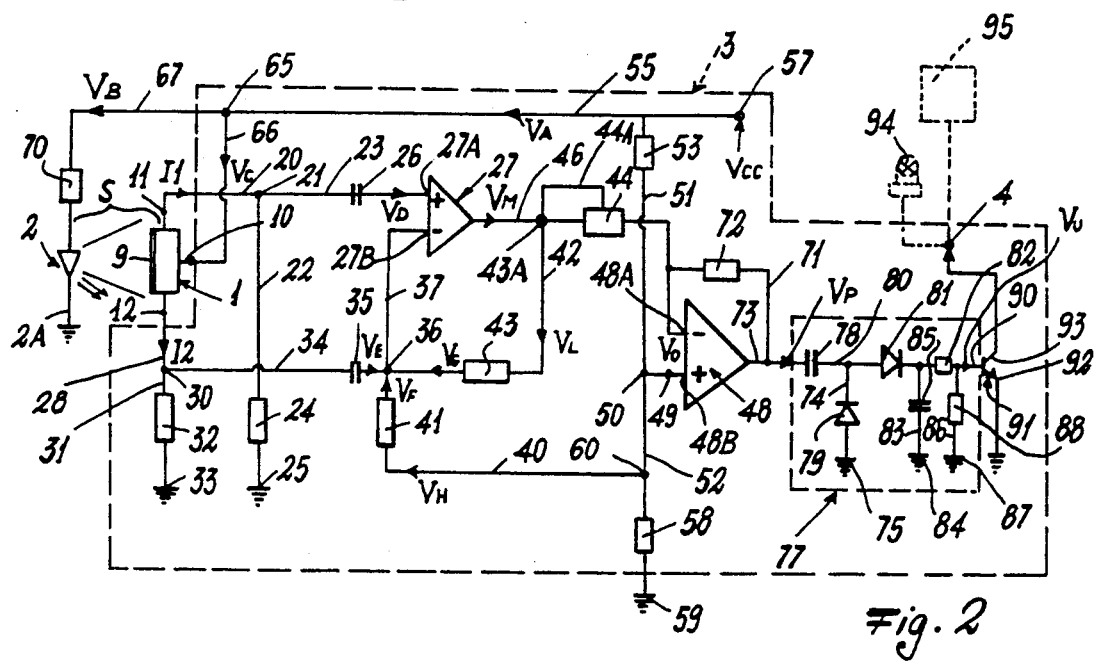
FIG. 2 is a schematic representation showing the essentials of a circuit scheme of the device according to the invention.

With particular reference to FIGS. 1 and 2, the device according to the invention comprises an optical sensor S consisting of a receiver member 1 cooperating with a light emitting member 2 and with a control circuit 3 having an output 4.

The emitter member 2, in particular an infrared light signal emitter having a wide emission angle, generates a light cone 6 within which the receiver 1 is positioned.

A yarn 8 fed to a known textile machine (not shown) such as a loom or a hosiery knitting machine freely moves within a sensitive region or area 7 of this cone. The area 7 is delimited by the cone and by the dimensions of the sensitive member or photosensitive surface 9 of the receiver 1.

The receiver 1, in one embodiment, is a known PSD or an optical position sensor able to generate, depending on the presence or absence of a light signal, at least two output currents I1 and I2 flowing from a cathode 10 to anodes 11 and 12 located to the sides 13 of the receiver 1.

This particular type of sensor has a large-dimension light sensitive surface (but totally contained within the cone 6), the choice of which is based on the position of the emitter 2, i.e., the position of the source generating the light which strikes the surface 9.

This arrangement allows simple determination of the state of movement and/or stoppage of a yarn being monitored by the device of the invention, without any limitation on the type of yarn or its position of movement, and with considerable insensitivity to accumulation of dust and other residues deriving from the movement of the yarn. All this is achieved because of the wide light cone generated by the emitter 2 and the large photo-sensitive surfaces 9 of the receiver 1.

The currents I1 and I2 derive from this arrangement, i.e., they are generated as a function of the variation in the position and/or shape of the shadow 17 (i.e., the dark region without light) generated on the photo-sensitive surface 9 of the yarn 8 present between the emitter 2 and the receiver 1 of the sensor S. As the position and/or shape of this shadow or dark region 17 varies on the surface 9, currents of different intensity are present at the anodes 11 and 12 of the receiver 1. This variation in position and/or shape occurs during the movement of the yarn 8 fed to the textile machine (not shown) and permits this movement to be detected.

This variation in the region 17 also can be related to least irregularity of the yarn (such as, for example, a change in its count or the presence of small malformations). The irregularity may be in a range of acceptability for using the yarn, the detection of the irregularity enabling a detection of the movement of the yarn.

Specifically, with reference to FIG. 2 (which shows a circuit for detecting only whether the yarn 8 is in movement or at rest), the anode 11 is connected to an electrical branch 20 terminating in a node 21 to which a branch 22 and a branch 23 are connected. The branch 22 comprises a resistor 24 connected to earth at 25. In the branch 23 there is a capacitor 26 connected to the non-inverting input 27A of a differential amplifier 27.

The anode 12 is connected via an electrical branch 28 to a node 30 to which there is connected a branch 31 containing a resistor 32 connected to earth at 33, and a branch 34 containing a capacitor 35 connected to a node 36.

To node 36, there is connected a branch 37 terminating at the inverting input 27B of the amplifier 27.

The node 36 also receives a branch 40 containing a resistor 41, and a branch 42 containing a further resistor 43 terminating in a node 43A to which there is connected a branch 44A terminating in a variable resistor 44 contained in the outlet branch 46 of the amplifier 27. The branch 46 terminates at the inverting input 48A of a second operational amplifier 48. A branch 49 extends to the non-inverting input 48B of the second operational amplifier 48. Branch 49 is connected, at a node 50, to an electrical branch 51 and an electrical branch 52.

In the electrical branch 51 there is a resistor 53. This branch 51 is connected to an electrical branch 55 connected to a direct current and voltage supply Vcc at the input 57 of the circuit 3.

In the electrical branch 52 there is a further resistor 58 connected to earth at 59, said branch 52 being connected to the branch 40 at a node 60.

Branch 55 is connected to a node 65 to which electrical branches 66 and 67 are connected, the first (66) being connected to the cathode 10 of the receiver 1 and the second (67) being connected to the emitter 2 (connected to earth at 2A) via a resistor 70.

In parallel with the second amplifier 48 there is a feedback branch 71 containing a resistor 72.

The branch 71 is connected to the output branch 73 of the second amplifier 48B, which is connected to a circuit part 77 acting as a rectifier and amplifier, such as a voltage doubler.

This circuit part, which is of known type, comprises a capacitor 78 in the branch 73 at the input of said circuit part, from which a branch 80 extends. To branch 80 there is connected a branch 74 containing a diode 79 connected to earth at 75. In the branch 80 there is a second diode 81 and a resistor 82. Between the diode 81 and resistor 82 there is connected to the branch 80 a branch 83 which is connected to earth at 84 and contains a capacitor 85. Downstream of the resistor 82, there is connected to the branch 80 a further branch 86 which is connected to earth at 87 and contains a resistor 88.

The circuit part 77 is connected to the base 90 of a static switch, such as a transistor 91, the emitter 92 of which is connected to earth. The collector 93 of the transistor 91 is connected to the output 4 of the circuit 3.

This output can be connected to an indicator-display 94 for indicating whether the yarn 8 has broken or is being correctly fed, to a control circuit 95 of known type for controlling the operation of the textile machine (not shown) to which the yarn is fed, or directly to a usual operating member of the machine.

The method of the invention will now be described with reference to the operation of the device. It will be assumed that initially the yarn 8 is at rest, i.e. is not being fed to the textile machine.

A continuous feed signal VA flows through the branch 55 and is divided at the node 65 into signals VB and VC. The signal VB passes through the resistor 70 to reach the emitter 2, the resistor acting as protection for the emitter by limiting the intensity of the signal VB.

The emitter 2 consequently generates the light cone 6, which strikes the photo-sensitive surface 9 of the receiver 1.

This light cone is interrupted by the yarn 8, which generates the shadow or dark region 17 on the surface 9 of the receiver 1.

The receiver 1 is fed at its cathode 10 with the signal VC, to generate as output at the anodes 11 and 12 the signals I1 and I2.

In the situation under examination, these signals represent the position (substantially fixed) of the shadow 17 on the surface 9.

With the yarn 8 at rest (or substantially so), the signals I1 and I2 quickly saturate the capacitors 26 and 35 (which consequently have infinite resistance and interrupt the branches 23 and 34 in which they are located) and thus discharge to earth via the resistors 24 and 32 along the branches 22 and 31.

During the entire period in which the yarn 8 is substantially at rest (i.e. is not being fed to the textile machine), no signal reaches the amplifiers 27 and 48 and consequently no signal reaches the transistor 91, with the result that there is no signal at the output 4 of the circuit 3. This indicates that the yarn is at rest.

This situation can be displayed by the indicator member 94 (which operates in known manner if no signal is present at the output 4) or is detected by the circuit 95, which stops the operation of the textile machine.

It will now be assumed that the yarn 8 is put into motion, e.g., the textile machine is operating.

In this situation, the yarn moves within the region 7, varying its shape and/or position and assuming the positions indicated by 8A, 8B and 8C in FIG. 1.

This yarn movement results in a movement of the shadow 17 on the surface 9 of their receiver 1.

Because of the movement, the signals I1 and I2 generated by the receiver vary in amplitude with time in accordance with the different position with time of the yarn in the sensitive region and, thus in accordance with the different position of the shadow 17 on the surface 9.

These mutually variable signals are applied across the ends of respective capacitors 26 and 35, which on the basis of these variations each sense variable potential differences between their plates.

These differences result in the generation of signals VD and VE by the capacitors 26 and 35 respectively.

The signals VD reaches the input 27A of the amplifier 27 and the signal VE reaches the node 36 where it combines with signals VF and VG originating from the branches 40 and 42. Specifically, the signal VF acts as a threshold or reference signal generated by the receiver 41 which operates as a polarization receiver; it acts on a signal VH which reaches the branch 40 from the branch 51 via the node 60 and the branches 52 and 51.

The signal VG is fed back to the amplifier by the resistor 43 acting on a signal VL reaching the branch 42 substantially from the output of the operational amplifier 27. The resistor 43 establishes the amplification of the operational amplifier. The resistor 44 however defines the amplification limit (adjustable) and participates in defining the gain of the amplifier 48.

From the node 36 the three signals VE, VF and VG (acting substantially as reference signals) reach the input 27B of the amplifier 27 and are compared therein, in known manner, with the signal VD.

The operational amplifier, hence acting as a comparator, generates an output signal VM equal substantially to the difference between the amplified signals VD and VE.

This signal is fed via the variable resistor 44 to the inverting input 48A of the amplifier 48, to the non-inverting input 48B of which there is applied a signal Vo generated from the signal VA via the voltage divider defined by the resistors 53 and 58.

The amplifier 48, acting as a comparator in known manner, generates at its output a sinusoidal signal VP Of gain defined by the ratio of the resistors 72 and 44.

The thus amplified signal is rectified and incremented (for example doubled) in known manner by the circuit part 77. This then generates a signal VU applied to the base 90 of the transistor 91, which becomes saturated. In this manner the output 4 is put into contact with the earth connected to the emitter 92 of said transistor, and an output signal is available for use in the circuit 95 or for interrupting the operation of the indicator 94 or for allowing the operation in known manner of the textile machine to which said output 4 is directly connected.

If the yarn 8 should stop, the transistor is again inhibited and there is no longer a signal present at the output 4. The previously described condition is hence re-established.

The use of a PSD sensor has been described by way of example. However this can be replaced by another known photo-sensitive element or the like able to generate a signal based on the shape or position of any object (in the case under examination the yarn 8); by way of example, a known image sensor of CCD (charge coupled device) type or the like can be used. In this case, the use of the emitter 2 can be avoided and the control circuit can be formed in known manner but completely different from that described in relation to FIG. 2, such as advantageously a microprocessor (logic) circuit dedicated to application with such an image sensor (for example the TCD104D of Toshiba Corporation, described on page 100 of the 1989 manual entitled "CCD Linear Image Sensor").

Such a sensor can be of linear or area type.

Figure 3:
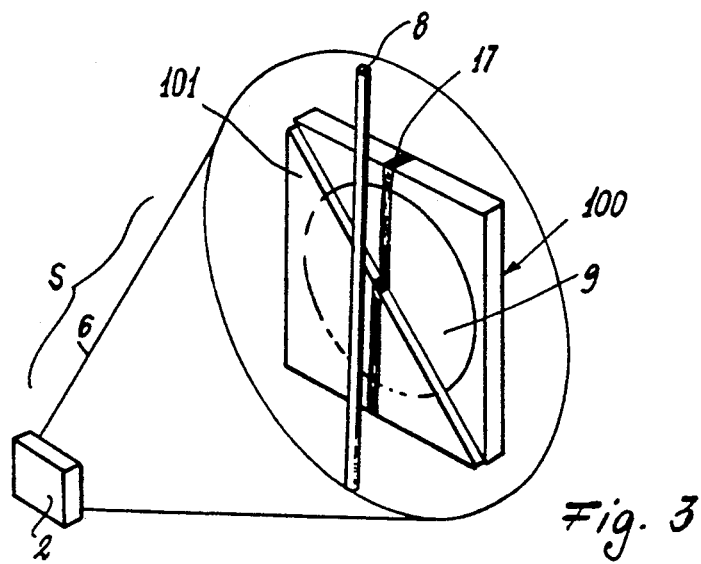
FIG. 3 is a schematic partial view of a further embodiment of the device according to the invention.

Another and more simple embodiment of the device for sensing on an image sensor an "image variation" corresponding to the variation in shape and/or position of a yarn fed to a textile machine as a function of the state of this yarn, comprises the use of a photosensitive element 100, for example of the type shown in FIG. 3 in which parts corresponding to those of the previous described figures are indicated by the same reference numerals.

In this embodiment, a diaphragm 101 of suitable shape (for example triangular) is placed on the receiver 1 to restrict its photosensitive surface 9.

In this manner, based on the area of the surface 9 obscured, the circuit 3, formed for example identical to that described, is able to sense the movement or non-movement of the yarn.

In this respect, if the area of the obscured surface does not change, the yarn is at rest. If however this area varies, the circuit 3 senses the movement of the yarn and hence the fact that it is being fed to the textile machine.

It should be noted that the emitter member, if present, can be of any type, either of visible or be formed with other components different from those described.

Various embodiments of the invention have been described, in which the receiver 1 comprises two anodes 11 and 12 from which corresponding currents emerge, their relative variation being used by the circuit 3 to determine the movement of the yarn. 8.

However, in a more simple and general form, the receiver 1 (or similar optical sensor) can be connected to the circuit 3 via a single anode or output (such as that indicated by 11). By this means, when the yarn 8 moves, a variable current flows as a consequence of this movement. This variation, measured by the circuit 3 by means, for example, of the corresponding capacitor 26, results in the generation of a variable signal (for example VD) which is compared with a fixed reference (for example a signal which is a function of VG and VF) within the comparator and amplifier 27. Hence in this embodiment, the capacitor 35, the branch 34, the anode 12 and the anode 31 shown in FIG. 2 are not present.

The circuit 3 operates on the single variable signal (for example VD) in the same manner as described in relation to FIG. 2.

The fixed reference, or reference signal, is a constant signal corresponding to an unchanged yarn state, or a signal corresponding to the yarn state condition immediately prior to the determined condition, or its current state.

I claim:

1. A method for determining and monitoring the state of movement or stoppage of a yarn fed to a textile machine, comprising arranging an optical sensor having a sensitive region in which said sensor detects movement, feeding a yarn to a textile machine through said sensitive region such that the yarn is freely movable through said sensitive region, determining a variation in at least one of the shape and position of the moving yarn relative to said optical sensor, generating a first electrical signal and a second electrical signal on the basis of the variation in at least one of the position and shape of the yarn, and operating an operating member of the textile machine on the basis of a relative variation of said first and second electrical signals, said operating member of the textile machine being selected from a group consisting of an indicator for indicating the state of movement or stoppage of the yarn and a machine control circuit.

2. A method as claimed in claim 1, wherein said sensor further comprises a light source and a photo-sensitive region arranged opposite said light source, said sensitive region being defined between said light source and said photo-sensitive region, the method further comprising determining the movement of the yarn by sensing a movement or shape variation of a shadow region generated by said yarn on said photo-sensitive surface of said sensor, generating said first and second electrical signals on the basis of the movement or shape variation of said shadow region on said surface, comparing said first and second electrical signals with a reference signal to detect the movement or variation of the yarn and to determine the state of the yarn, and generating an output signal indicative of the state of the yarn on the basis of said comparison.

3. A method as claimed in claim 2, further comprising arranging the output signal to operate switch means, the opening or closure of said switch means providing the electrical signal for operating the operating member of the textile machine.

4. A method as claimed in claim 2, further comprising providing the reference signal as a constant signal corresponding to an unchanged yarn state when the yarn is not in motion.

5. A method as claimed in claim 2, further comprising providing the reference signal as a signal corresponding to the yarn state condition immediately prior to the current condition.

6. A method as claimed in claim 2, further comprising restricting the photo-sensitive surface of the sensor and sensing the variation or movement of an area of said surface obscured by the yarn.

7. A device for determining the state of movement or stoppage of a yarn fed to a textile machine, comprising
optical sensor means for sensing movement of a yarn through a sensitive region in said sensor means and for generating first and second electrical signals in accordance with a variation in at least one of the position and shape of the yarn relative to said sensor means as the yarn passes through said sensitive region, the yarn being freely movable through said sensitive region,
comparator means arranged to compare said first electrical signal and said second electrical signal emitted by said sensor means with a reference signal,
said comparator means generating at least one electrical output signal indicative of the state of movement or stoppage of the yarn on the basis of a relative variation of said first and second electrical signals.

8. A device as claimed in claim 7, wherein the output signal operates switch means arranged to interrupt or not interrupt the feed of an electrical signal to an output.

9. A device as claimed in claim 7, wherein said sensor means comprise an optical position sensor or a PSD sensor.

10. A device as claimed in claim 7, wherein said sensor means comprise an image sensor or a CCD sensor.

11. A device as claimed in claim 7, wherein said sensor means comprise a photo-sensitive element having a partly screened sensitive surface.

12. A device as claimed in claim 7, wherein said sensor means comprise a light emitting element and a receiver member having a photo-sensitive surface, said receiver member being completely contained within a light cone generated by said emitting element, said sensitive region being defined in said light cone between said emitting element and said receiver member such that yarn causes shadows to fall on said photo-sensitive surface to generate said first and second electrical signals, said emitting element and said receiver member being coupled in a circuit, said circuit comprising means to limit the intensity of the signal reaching said emitting element.

13. A device as claimed in claim 7, wherein said comparator means comprise at least one operational amplifier.

14. A device as claimed in claim 7, wherein said comparator means comprise a control circuit of microprocessor type.

15. A device as claimed in claim 7, wherein said comparator means comprise a logic circuit arranged to operate with image sensors.

16. A device as claimed in claim 7, wherein said switch means comprise a static switch.

17. A device as claimed in claim 7, wherein the output signal of said comparator means is fed to means for feeding the textile machine.

18. A device as claimed in claim 7, wherein the output signal of said comparator means is fed to indicator means.

19. A device as claimed in claim 7, wherein the output signal of said comparator means is fed to a control and operating circuit for the textile machine.

20. A method for determining and monitoring the state of movement or stoppage of a yarn fed to a textile machine by using an optical scanner, comprising
arranging a light source to provide a cone of light,
arranging a photo-sensitive receiver within said cone of light and opposite to said light source such that a sensitive region is defined therebetween,
coupling said light source and said photo-sensitive receiver in a circuit,
passing a yarn to a textile machine through said sensitive region such that the yarn causes a shadow region on said receiver,
determining a variation in at least one of the shape and position of the yarn passing through said sensitive region,
generating a first electrical signal and a second electrical signal on the basis of a variation of the shadow region on said receiver corresponding to the variation in at least one of the shape and position of the yarn,
converting the electrical signals to an output signal, and
passing the output signal to an operating member of the textile machine, said operating member of the textile machine being selected from a group consisting of an indicator for indicating the state of movement or stoppage of the yarn and a machine control circuit.

* * * * *